United States Patent
Joshi et al.

(10) Patent No.: US 12,248,439 B2
(45) Date of Patent: *Mar. 11, 2025

(54) AFFINITY SCORING

(71) Applicant: Aurea Software, Inc., Austin, TX (US)

(72) Inventors: Ashutosh Joshi, Fremont, CA (US); Martin Betz, Palo Alto, CA (US); David Cooke, Los Altos, CA (US); Rajiv Arora, Gurgaon (IN); Binay Mohanty, New Delhi (IN); Ansuman Mishra, New Delhi (IN)

(73) Assignee: Aurea Software, Inc., Austin, TX (US)

( * ) Notice: Subject to any disclaimer, the term of this patent is extended or adjusted under 35 U.S.C. 154(b) by 676 days.

This patent is subject to a terminal disclaimer.

(21) Appl. No.: 16/788,149

(22) Filed: Feb. 11, 2020

(65) Prior Publication Data

US 2020/0183893 A1 Jun. 11, 2020

Related U.S. Application Data

(63) Continuation of application No. 13/754,856, filed on Jan. 30, 2013, now Pat. No. 10,592,480.

(60) Provisional application No. 61/757,133, filed on Jan. 26, 2013, provisional application No. 61/747,345, filed on Dec. 30, 2012.

(51) Int. Cl.
*G06F 16/21* (2019.01)
(52) U.S. Cl.
CPC .................................. *G06F 16/21* (2019.01)

(58) Field of Classification Search
CPC .............. G06F 16/24578; G06F 16/248; G06F 16/313; G06F 16/93; G06F 16/95
See application file for complete search history.

(56) References Cited

U.S. PATENT DOCUMENTS

| | | | | |
|---|---|---|---|---|
| 5,640,553 A * | 6/1997 | Schultz | ............... | G06F 16/3346 707/999.005 |
| 7,849,087 B2 * | 12/2010 | Goutte | ................ | G06F 40/284 704/9 |
| 2003/0018659 A1 * | 1/2003 | Fuks | .................. | G06Q 30/02 707/999.005 |
| 2003/0074516 A1 * | 4/2003 | Cho | ....................... | G06F 16/35 707/E17.099 |
| 2005/0071365 A1 * | 3/2005 | Hou | ...................... | G06F 16/313 707/E17.084 |

(Continued)

OTHER PUBLICATIONS

Pirkola, A., Topic-Specific Web Searching Based on a Real-Text Dictionary, WEBIST 2012, pp. 1-20. (Year: 2012).*

(Continued)

*Primary Examiner* — Cheyne D Ly

(57) ABSTRACT

Some embodiments provide a method for determining a relatedness of content items to categories. The method identifies a particular content item, a relevancy score associated with the particular content item, and a set of categories to which the particular content item is classified as related. Based on a set of glossaries associated with the set of categories, the method calculates a set of affinity scores that each represents a degree of relevancy between the particular content item and a category in the set of categories. The method modifies the relevancy score associated with the particular content item based on the calculated set of affinity scores.

18 Claims, 9 Drawing Sheets

(56) References Cited

U.S. PATENT DOCUMENTS

| | | | | |
|---|---|---|---|---|
| 2006/0253423 | A1* | 11/2006 | McLane | G06F 16/951 |
| 2008/0294624 | A1* | 11/2008 | Kanigsberg | G06F 16/9535 |
| | | | | 707/999.005 |
| 2009/0094204 | A1* | 4/2009 | Shiraishi | G06F 16/951 |
| 2010/0106560 | A1* | 4/2010 | Li | G06Q 10/06 |
| | | | | 705/347 |
| 2010/0146006 | A1* | 6/2010 | Dasgupta | G06F 16/36 |
| | | | | 707/802 |
| 2014/0047023 | A1* | 2/2014 | Baldwin | G06Q 10/10 |
| | | | | 709/204 |
| 2014/0095527 | A1* | 4/2014 | Mohania | G06F 16/24522 |
| | | | | 707/766 |

OTHER PUBLICATIONS

Notice of Allowance dated Aug. 14, 2019, filed in U.S. Appl. No. 13/754,856, pp. 1-10.
Request for Continued Examination dated Jul. 8, 2019, filed in U.S. Appl. No. 13/754,856, pp. 1-13.
Advisory Action dated Jul. 3, 2019, filed in U.S. Appl. No. 13/754,856, pp. 1-4.
Response to Final Office Action dated Jun. 7, 2019, filed in U.S. Appl. No. 13/754,856, pp. 1-10.
Final Rejection dated Jan. 7, 2019, filed in U.S. Appl. No. 13/754,856, pp. 1-11.
Petition Decision Routed to the Technology Center to Act on the Decision or Continue Prosecution dated Oct. 5, 2018, filed in U.S. Appl. No. 13/754,856, pp. 1-5.
Petition for Review by the Office of Petitions, filed in U.S. Appl. No. 13/754,856, pp. 1-4.
Response to Non-Final Office Action dated May 17, 2018, filed in U.S. Appl. No. 13/754,856, pp. 1-9.
Non-Final Rejection dated Oct. 27, 2016, filed in U.S. Appl. No. 13/754,856, pp. 1-12.
Appeal Brief dated Mar. 28, 2016, filed in U.S. Appl. No. 13/754,856, pp. 1-22.
Notice of Appeal dated Dec. 29, 2015, filed in U.S. Appl. No. 13/754,856, pp. 1-2.
Final Rejection dated Sep. 23, 2015, filed in U.S. Appl. No. 13/754,856, pp. 1-10.
Amendment and Response to Office Action dated Jun. 25, 2015, filed in U.S. Appl. No. 13/754,856, pp. 1-11.
Non-Final Rejection dated Feb. 25, 2015, filed in U.S. Appl. No. 13/754,856, pp. 1-10.
Applicant Response to Pre Exam Formalities dated May 28, 2013, filed in U.S. Appl. No. 13/754,856, pp. 1-5.

* cited by examiner

Industry X Affinity Score: 99.9279

Affinity Tokens: [Acme:0.7357, drug:0.5951, pharmaceutical:0.5306, case:0.1315, probe:0.0869, including:0.0781, the: 0.0771, against:0.0771, came:0.0771, government:0.0771, other:0.0771, maker:0.0771]

Matching Words: [Acme:0.7357, drug:0.5951, pharmaceutical:0.5306, case:0.1315, probe:0.0869, including:0.0781]

Default Score: 0.0771

AFFINITY SCORING

CLAIM OF BENEFIT TO PRIOR APPLICATIONS

This application claims the benefit of U.S. Provisional Patent Application 61/747,345, filed Dec. 30, 2012; and U.S. Provisional Patent Application 61/757,133, filed Jan. 26, 2013. Provisional Patent Applications 61/747,345 and 61/757,133 are hereby incorporated by reference.

BACKGROUND

Most information today is stored electronically and is available on the World Wide Web. This information includes blog posts, articles (e.g., news articles, opinion pieces, etc.), research papers, web pages, microblog posts (e.g., tweets), and many other types of documents. While having this much information available is useful, it may be very difficult to find information relevant to a particular topic for a particular objective. Furthermore, it may be difficult to stay abreast of new information that becomes available regarding the particular topic on a continuing basis.

Search engines exist today to attempt to find documents on the web that relate to a search string input by the user. However, most search engines base their search on just the words and operators (e.g., "and", "or", etc.) entered by a user. When a user searches for a particular topic, the search engine will only find documents that use the entered word or words, which will lead to many relevant documents being completely overlooked. Such search engines cannot provide a good overview of the documents that surround a particular topic.

BRIEF SUMMARY

Some embodiments of the invention provide a method for determining the affinity of a piece of content (e.g., documents, tweets, articles, etc.) to a particular category (e.g., a company, a topic, an industry, a business line, a person, a product, etc.). In some embodiments, the affinity of a piece of content to a particular category is expressed as the probabilistic correlation of the piece of content to the particular category. The method of some embodiments uses a glossary defined for a particular category in order to determine the affinity of the piece of content to the particular category. In some embodiments, a glossary is a collection of words associated with probability values. The probability value associated with a particular word in the glossary represents, in some embodiments, the probability that a given piece of content is related to a particular category for which the glossary is defined when the piece of content contains the particular word.

In some embodiments, the method operates on content that is pre-processed (e.g., by a classification system) by a system that (1) derives and/or identifies (e.g., using semantic analysis) information (e.g., entities persons, events, facts, etc.) in the content, (2) classifies the content (e.g., by tagging the content) as pertaining to one or more categories based on the information, and (3) organizes (e.g., by ranking the content based on calculated relevancy scores, confidence scores, etc.) the content in terms of relevancy to categories. Some embodiments use a business web graph to pre-process the content.

The method of some embodiments is used to modify (e.g., increase or decrease) the relevancy of the pre-processed content to improve the relevancy of the content to categories and, thus, provide better results when the content is searched (e.g., by a search engine) for content that is related to certain categories. For instance, the pre-processed system may determine that a piece of content pertains to an entity or topic, which is related to a particular industry (e.g., the automotive industry, the medical industry, the semiconductor industry, etc.) based on the business web graph. In some embodiments, when the method determines the content has an affinity to the particular industry, this provides additional evidence that the content is in fact related to the particular industry. In such instances, the method modifies the relevancy of the pre-processed content by increasing the relevancy of the content to the particular industry.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one of ordinary skill in the art that the invention is not limited to the embodiments set forth and that the invention may be practiced without some of the specific details and examples discussed.

Some embodiments of the invention provide a method for determining the affinity of a piece of content (e.g., documents, tweets, articles, etc.) to a particular category (e.g., a company, a topic, an industry, a business line, a person, a product, etc.). In some embodiments, the affinity of a piece of content to a particular category is expressed as the probabilistic correlation of the piece of content to the particular category. The method of some embodiments uses a glossary defined for a particular category in order to determine the affinity of the piece of content to the particular category. In some embodiments, a glossary is a collection of words associated with probability values. The probability value associated with a particular word in the glossary represents the probability that a given piece of content is related to a particular category for which the glossary is defined when the piece of content contains the particular word.

In some embodiments, the method operates on content that is pre-processed (e.g., by a classification system) by a system that (1) derives and/or identifies (e.g., using semantic analysis) information (e.g., entities persons, events, facts, etc.) in the content, (2) classifies the content (e.g., by tagging the content) as pertaining to one or more categories based on the information, and (3) organizes (e.g., by ranking the content based on calculated relevancy scores, confidence scores, etc.) the content in terms of relevancy to categories. Some embodiments use a business web graph to pre-process the content.

The method of some embodiments is used to modify (e.g., increase or decrease) the relevancy of the pre-processed content to improve the relevancy of the content to categories and, thus, provide better results when the content is searched (e.g., by a search engine) for content that is related to certain categories. For instance, the pre-processed system may determine that a piece of content pertains to an entity or topic, which is related to a particular industry (e.g., the automotive industry, the medical industry, the semiconductor industry, etc.) based on the business web graph. In some embodiments, when the method determines the content has an affinity to the particular industry, this provides additional evidence that the content is in fact related to an entity mapped to the particular industry. In such instances, the method modifies the relevancy of the pre-processed content by increasing the relevancy of the content to the particular entity.

Figure 1:
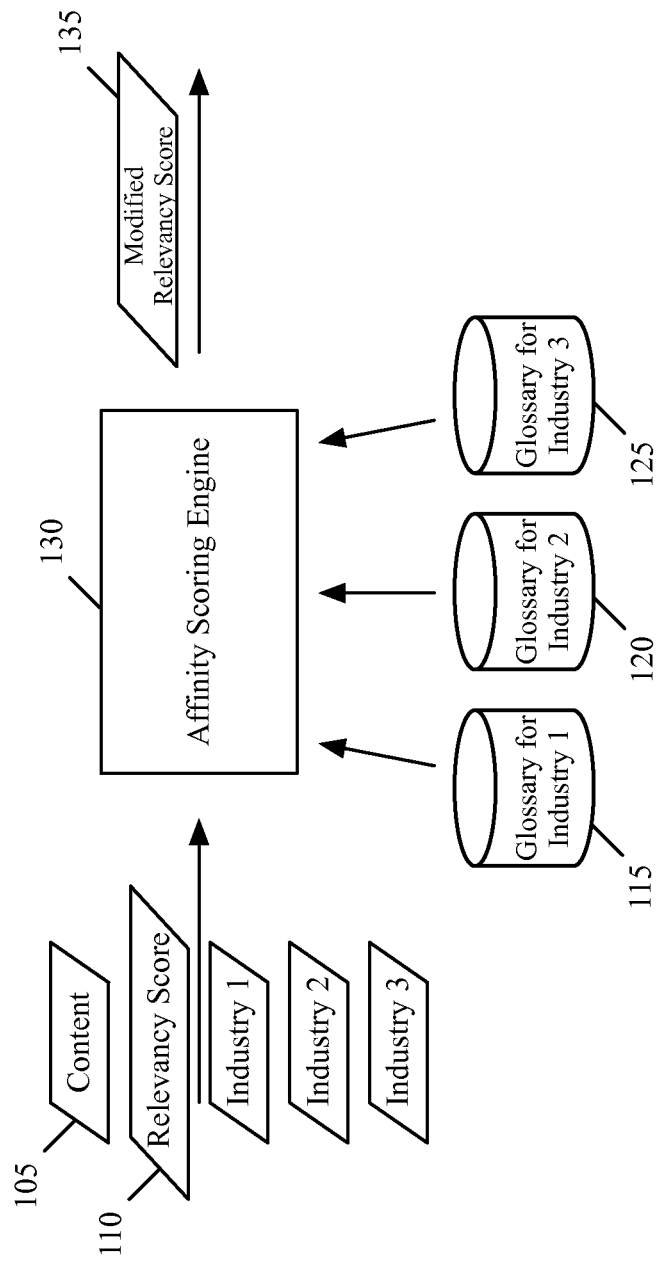
FIG. 1 conceptually illustrates an affinity scoring engine of some embodiments for determining the affinity of a piece of content to a particular category.

FIG. 1 conceptually illustrates an affinity scoring engine 130 of some embodiments that performs a method for determining the affinity of a piece of content to a particular category. Specifically, the affinity scoring engine 130 in this example (1) performs the affinity determination for content that is pre-processed (e.g., classified) to generate a relevancy score of the content and several industries to which the content is identified as relevant and (2) modifies the relevancy score of the content based on the affinity determination. In some embodiments, a relevancy score quantifies the association (e.g., "aboutness") of a particular piece of content to a category (a set of industries in this example).

As shown, the affinity scoring engine 130 receives as input content 105, a relevancy score 110, and industries 1-3, and outputs a modified relevancy score 135. Content 105 may be a document (e.g., a text file, a HyperText Markup Language (HTML) file, an Extensible Markup Language (XML) file, a word-processor file, etc.), a tweet, an article, a blog post, etc. The relevancy score 110 represents when the content was previously processed. For this example, the industries 1-3 are the three industries to which content 105 was tagged as being closest (e.g., most relevant) according to distances (e.g., the shortest distances) in the business web graph when the content was previously processed. While FIG. 1 illustrates three industries to which content 105 was tagged as being closest, one of ordinary skill in the art will realize that content 105 may be tagged as being closest to any number of industries.

In addition, FIG. 1 illustrates that the affinity scoring engine 130 receives as input glossaries 115-125, which are glossaries for the industries 1-3 to which content 105 is specified as being closest. As mentioned above, a glossary of some embodiments is defined for a particular category. In some embodiments, when the affinity scoring engine 130 receives the data indicating a set of industries to which the content is specified as being closest, the affinity scoring engine 130 identifies the glossaries defined for the set of industries. In this example, when the affinity scoring engine 130 receives the data indicating industries 1-3, the affinity scoring engine 130 identifies the glossaries 115-125, which are defined for the industries 1-3. For each industry 1-3, the affinity scoring engine 130 determines an affinity score that is expressed as a probability of the industry given content 105. As explained above, a glossary of some embodiments is a collection of words associated with probability values and the probability value associated with a particular word in the glossary represents the probability that a given piece of content is related to a particular category for which the glossary is defined when the piece of content contains the particular word. Thus, to determine the probability of a particular industry given content 105, the affinity scoring engine 130 of some embodiments (1) identifies the words in content 105 that have matches in the glossary defined for the particular industry, (2) assigns the identified words with the probability values associated with the matching words in the glossary, and (3) calculates a probability estimation of the identified words together based on the probability values of the identified words. Accordingly, the calculated probability estimation is the affinity score for the content 105, which represents the probability of the particular industry given the content 105.

After the affinity scoring engine 130 determines an affinity score for each of the industries 1-3, the affinity scoring engine 130 of some embodiments modifies the relevancy score 110 based on the determined affinity scores, and outputs the modified relevancy score 135. Different embodiments use different techniques to modify the relevancy score 110. Details of one technique are described below.

Many of the details, examples, and embodiments described in this application relate to affinity of content to industries. However, one of ordinary skill in the art will understand that the same or similar techniques may be used for generating glossaries for other categories and determining the affinity of content to the other categories based on the corresponding glossaries. For example, such techniques may be utilized to generate glossaries for and determine the affinity of content to topics, persons, companies, business lines, products, etc.

Several more detailed embodiments of the invention are described in the sections below. Section I describes details of generating glossaries according to some embodiments of the invention. Section II then describes details of affinity scoring according to some embodiments of the invention. Next, Section III describes an example system of some embodiments in which the glossary generator and the affinity scoring engine are used. Finally, Section IV describes an electronic system with which some embodiments of the invention are implemented.

I. Glossary Generation

As discussed above, the method of some embodiments uses different glossaries defined for different categories to determine the affinity of a piece of content to the different categories. In some embodiments, a glossary is a collection of words associated with probability values where the probability value associated with a particular word in the glossary represents the probability that a given piece of content is related to a particular category for which the glossary is defined when the piece of content contains the particular word.

Different embodiments generate glossaries using different methods. For instance, some embodiments generate glossaries based on a Naïve Bayes algorithm. Under such an approach, (1) a piece of content is considered a "bag of words" and (2) every word in the piece of content is assumed to be independent from other words in the piece of content (the Naïve Bayes assumption). That is, the probability of a particular word occurring in the piece of content is independent of the probability of another word occurring in the piece of content.

Figure 2:
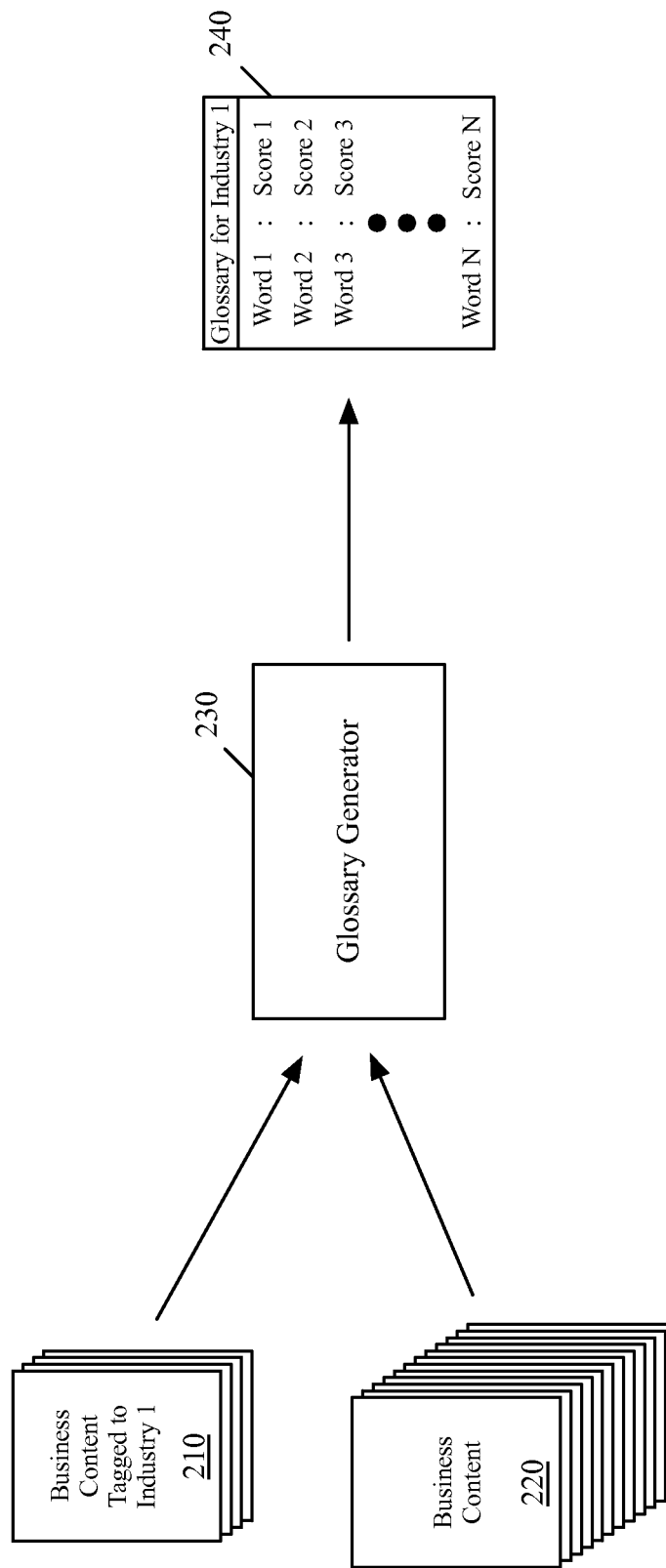
FIG. 2 conceptually illustrates the input and output of a glossary generator of some embodiments.

FIG. 2 conceptually illustrates the input and output of a glossary generator 230 of some embodiments. As shown, the glossary generator 230 receives as input a collection of business content 220 and a set of business content 210 that tagged to an industry (industry 1 in this example). In some embodiments, the set of business content 210 is a subset of content in the collection of business content 220. The collection of business content 220 of some embodiments includes content that the pre-processing system described above has processed within a defined interval (e.g., content processed within the most recent 24 hours, week, month, 60 days, year, etc.).

The glossary generator 230 of some embodiments generates a glossary for industry 1 based on the input by identifying words that occur in the set of business content 210 and calculating a score (also referred to as a glossary word score) for each of the identified words. In some embodiments, a glossary word score is a probability value that represents the probability that a given piece of content is related to an industry for which the glossary is defined when the piece of content contains the word associated with the glossary word score.

As illustrated in FIG. 2, the glossary generator 230 outputs a glossary 240 for industry 1 that includes words 1-N that occur in the set of business content 210 and glossary word scores 1-N for the words 1-N. In some embodiments, the glossary generator 230 performs the process 400 described below by reference to FIG. 4 to generate the glossary 240.

Figure 3:
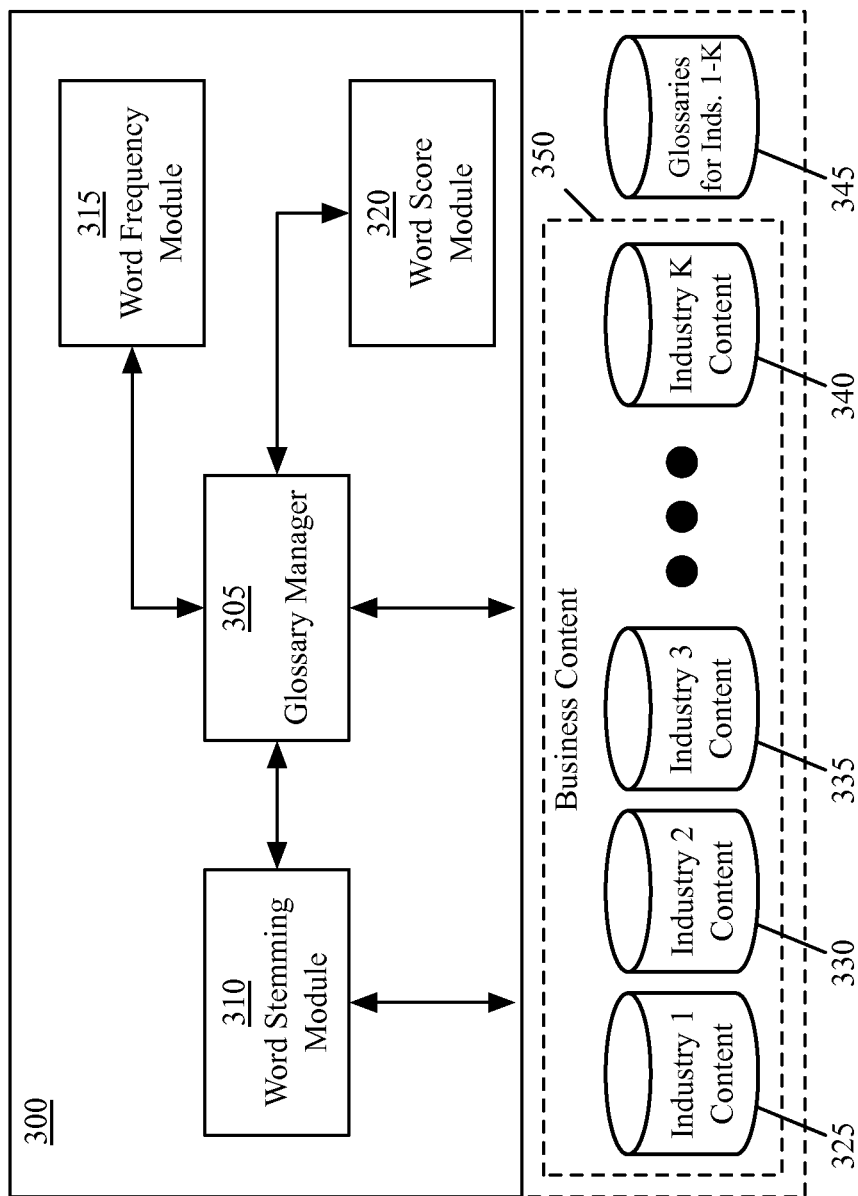
FIG. 3 conceptually illustrates a software architecture of a glossary generator of some embodiments.

FIG. 3 conceptually illustrates a software architecture of a glossary generator 300 of some embodiments. In some embodiments, the glossary generator 300 is a module that (1) receives as input a collection of business content and a set of business content tagged to an industry and (2) outputs a glossary for the industry that includes words and scores associated with the words, as illustrated in FIG. 2. The glossary generator 300 of some embodiments performs the process 400 described below by reference to FIG. 4, to generate a glossary.

As shown, the glossary generator 300 includes a glossary manager 305, a word stemming module 310, a word frequency module 315, and a glossary word score module 320. FIG. 3 also illustrates storage 325 for storing business content tagged to an industry 1, storage 330 for storing business content tagged to an industry 2, storage 335 for storing business content tagged to an industry 3, storage 340 for storing business content tagged to an industry K, and storage 345 for storing glossaries for industries 1-K. As shown in this example, the storages 325-340 collectively form a collection of business content 350. In some embodiments, the collection of business content 350 includes content that is not tagged to a particular industry. In some embodiments, the storages 325-345 are implemented as one physical storage while, in other embodiments, the storages 325-345 are implemented in separate physical storages. Still, in some embodiments, one or more of the storages 325-345 are implemented across multiple physical storages.

The glossary manager 305 handles the generation of different glossaries for different industries. In some embodiments, glossary manager 305 generates glossaries for the industries 1-K at defined intervals (e.g., once every day, week, month, etc.) in order for the glossaries 1-K to reflect any new business content that was not previously used to generate the glossaries 1-K.

To generate a glossary for a particular industry, the glossary manager 305 of some embodiments directs the word stemming module 310 to stem the words in the collection of business content 350. Then, the glossary manager 305 receives the collection of business content 350 with the words stemmed and identifies business content that tagged to the particular industry. In some embodiments, the glossary manager 305 uses the word frequency module 315 and the glossary word score module 320 to calculate the glossary word scores for words the occurs in the business content tagged to the particular industry. In some embodiments, the glossary manager 305 applies a frequency threshold when generating a glossary for the particular industry. For instance, the glossary manager 305 of some embodiments does not include a particular word in the glossary when the particular word does not occur in at least three different pieces of business content that is tagged to the particular industry. When the glossary manager 305 finishes generating the glossary, the glossary manager 305 stores the glossary in the storage 340.

The word stemming module 310 retrieves a set of business content (e.g., requested and specified by the glossary manager 305) from the storages 325-340 and stems the words the occur in the set of retrieved business content. In some embodiments, the word stemming module 310 stems word in the retrieved set of business content by reducing inflected or derived words to their base or root form. For instance, the word stemming module 310 reduces the word "fished," "fishing," and "fisher" to their root form "fish". The word stemming module 310 of different embodiments uses different methods to stem words (e.g., lookup tables, suffix-stripping algorithms, lemmatization algorithms, stochastic algorithms, etc.).

The word frequency module 315 is responsible for calculating the frequency of words across a set of business content. For example, the word frequency module 315 might receive a request from the glossary manger 305 to calculate the frequency of words across the collection of business content 350 or a particular industry (e.g. industry 1, 2, or 3).

The glossary word score module 320 calculates a glossary word score for a word. For instance, in some embodiments, the glossary word score module 320 receives from the glossary manager 305 a frequency of a particular word across the collection of business content 350 and a frequency of the particular word across business content that is tagged to a particular industry (e.g. industry 1, 2, or 3.) and uses equations (1) and (1) described below to calculate the glossary word score for the particular word.

Figure 4:
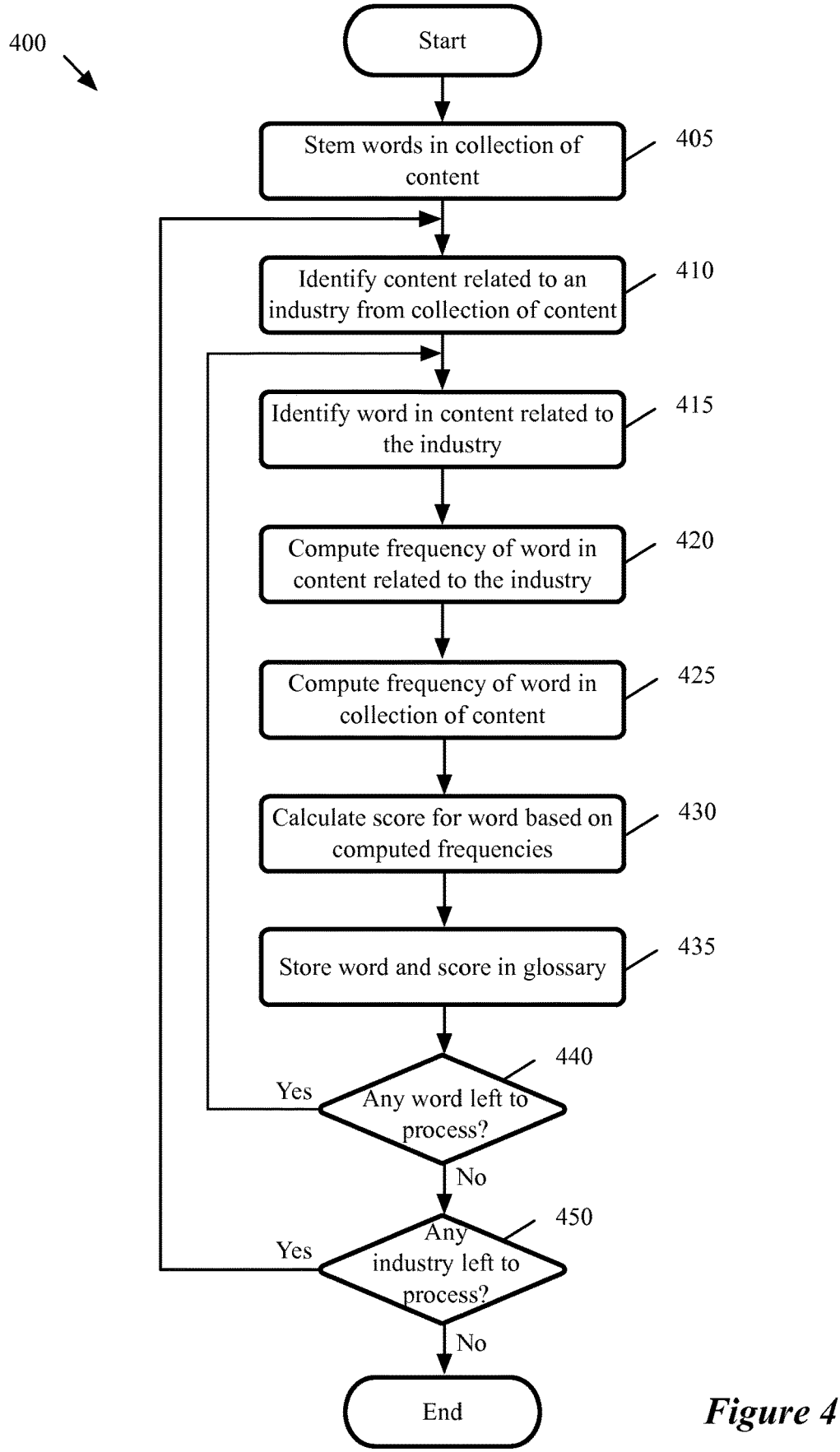
FIG. 4 conceptually illustrates a process of some embodiments for generating glossaries for different industries.

An example operation of the glossary generator 300 will now be described by reference to FIG. 4, which conceptually illustrates a process 400 of some embodiments for generating glossaries for different industries. In performing the process 400, in some embodiments, the pre-processing system described above performs the process 400 to generate a glossary for each industry used in the system (e.g., industries identified based on the business web graph). The pre-processing system of some embodiments performs the process 400 for each industry at defined intervals (e.g., once every day, week, month, etc.) in order to keep the glossaries current.

The operation begins by the glossary manager 305 instructing the word stemming module 310 to stem the words in the collection of business content 350. In response, the word stemming module 310 starts the process 400 starts by performing 405 to stem the words in a collection of content (the collection of business content 350 in this example). In some embodiments, the collection of content is content related to business (also referred to as business content) and includes all the content that the pre-processing system has processed while, in other embodiments, the collection of content includes content that the pre-processing system has processed within a defined interval (e.g., content processed within the most recent 24 hours, week, month, 60 days, year, etc.).

Once the word stemming module 310 finishes stemming the words, the word stemming module 310 sends the glossary manager 305 the collection of business content 350 with the words stemmed. The glossary manager 305 then performs 410 of the process 400 to identify content that is related to a particular industry (e.g., business content tagged to industry 1, 2, or 3) from the collection of content. As explained above, the pre-processing system classifies content as pertaining to one or more categories. In some embodiments, the process 400 uses the classification of the content to identify the content that is related to the particular industry. The pre-processing system of some embodiments assigns a relevancy strength indicator (e.g., high, medium, and low strength) when the system classifies to a piece of content as related to a particular industry. In some such embodiments, the process 400 identifies the content (1) that is related to the particular industry and (2) that has a particular level of relevancy strength (e.g., high, medium or higher, low or higher).

Next, the glossary manager 305 performs 415 of the process 400 to identify a word in the identified content that is related to the particular industry. Once a word is identified, the glossary manager 3050 requests the word frequency module 315 to performs 420 of the process 400 to compute the frequency of the word across the content (with the words stemmed) that is related to the particular industry. In some embodiments, the process 400 applies a frequency threshold to the word. For instance, when the word occurs in at least three different pieces of content related to the particular industry, the process 400 continues. When the word does not occur in at least three different pieces of content related to the particular industry, the process 400 proceeds to 440 to continue processing words.

The glossary manager 305 also requests the words frequency module 315 to perform 425 of the process 400 to compute the frequency of the word across the collection of content (the collection of business content 350 with the words stemmed in this example). Then the glossary manager 305 instructs the words score module 320 to perform 430 of the process 400 to calculate a score for the word based on the computed frequencies. The process 400 of some embodiments uses the following equation (1) to calculate the score for the word in terms of the probability of the particular industry given the word has occurred (e.g., in a piece of content):

$$P(\text{Industry} \mid \text{word}) = \frac{\alpha + contentFreq(\text{word} \mid \text{Industry})}{\alpha d + contentFreq(\text{word} \mid \text{Business})} \quad (1)$$

where $\alpha$ and d are constants, contentFreq(word|Industry) is the computed frequency of the word in the content related to the particular industry, and contentFreq(word|Business) is the computed frequency of the word in the collection of business content. For this example, $\alpha$ is the probability of industry (P(Industry)) and d is $1/\alpha$. In some embodiments, the probability of the particular industry is calculated using the following equation (2):

$$P(\text{Industry}) = \frac{numContentTaggedtoIndustry}{numContentinBusiness} \quad (2)$$

where numContentTaggedtoIndustry is the number of pieces of content identified as related to the particular industry and numContentBusiness is the number of pieces of content in the collection of business content. In some embodiments, the probability of an industry is the probability that a random piece of content is related to an industry (e.g., the random piece of content being tagged to the industry). In addition, given a random word (or a word that has never occurred before), the probability of the industry given the random word is equal to the probability that a random piece of content is related to the industry (e.g., the piece of content being tagged to the industry).

Upon calculating the score for the word, the words score module 320 sends the score to the glossary manager 305 for the glossary manager 305 to perform 435 of the process 400 to store the word and the score in the glossary for the particular industry. In this example, the glossary manager 305 stores the word and score in the storage 345. The glossary manager 305 then performs 440 of the process 400 to determine whether any word in the content related to the particular industry is left to process. When the process 400 determines that a word is left to process, the process 400 returns to 415 to continue processing any remaining words in the content related to the particular industry.

When the process 400 determines that no word is left in the content related to the particular industry to process, the glossary manager 305 performs 450 of the process 400 to determine whether any industry in the collection of content is left to process. When the process 400 determines that an industry is left to process, the process 400 returns to 410 to continue generating glossaries for any remaining industries in the collection of content. When the process 400 determines that no industry is left to process, the process 400 ends.

Once the process 400 ends, the glossary for each particular industry includes all the words that occur in the content related to the particular industry. In addition, each word in the glossary is associated with a score that represents the probability of the particular industry given the word. In some embodiments, the score is referred to as a Bayesian probability estimation of the particular industry given the word.

II. Affinity Scoring

As described above, the method of some embodiments determines the affinity of a piece of content to a particular category expressed as the probabilistic correlation of the piece of content to the particular category based on a glossary defined for a particular category. In some embodiments, the method uses glossaries that are generated in the manner described above in Section I.

Figure 5:
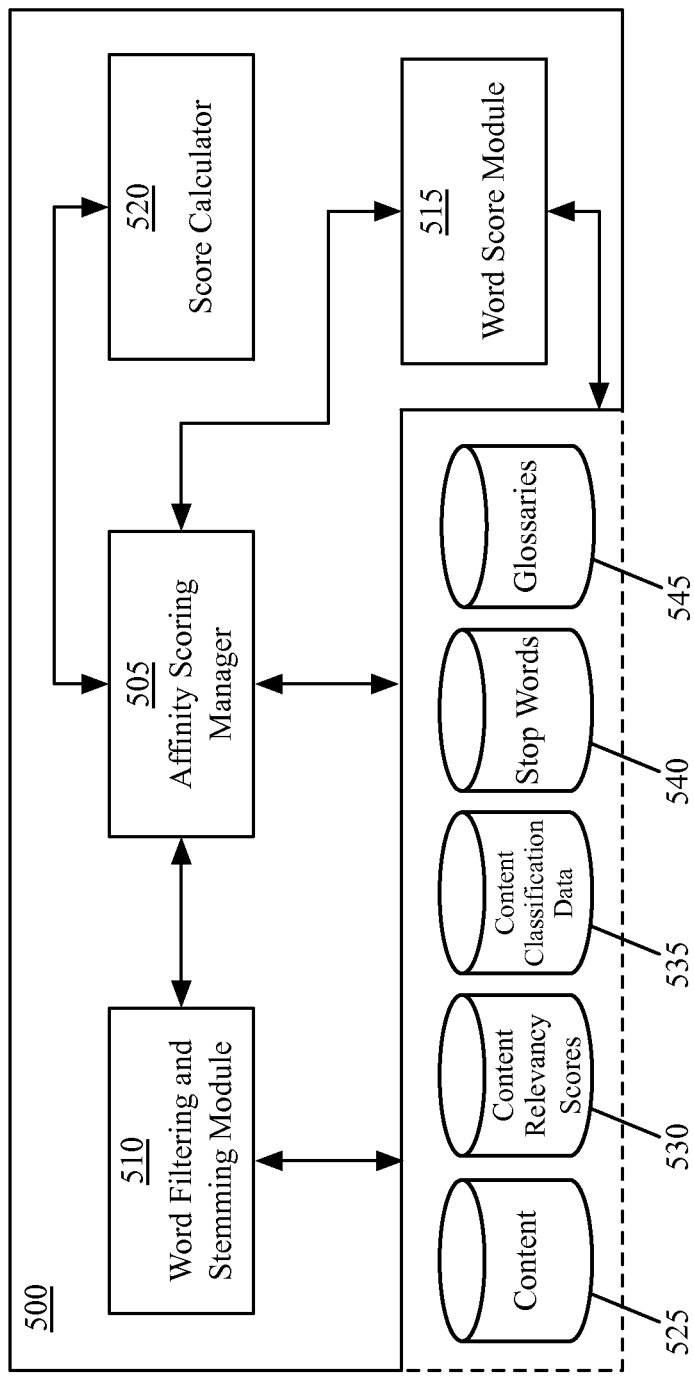
FIG. 5 conceptually illustrates a software architecture of an affinity scoring engine of some embodiments.

FIG. 5 conceptually illustrates a software architecture of an affinity scoring engine 500 of some embodiments. In some embodiments, the affinity scoring engine 500 is a module that (1) receives as input a piece of content, a relevancy score associated with the piece of content, a set of industries to which the piece of content is specified as being closest, and a set of glossaries associated with the set of industries, and (2) outputs a modified relevancy score for the piece of content, as illustrated in FIG. 1. The affinity scoring engine 500 of some embodiments performs the process 600 described below by reference to FIG. 6, to determine the affinity of the piece of content to the set of industries.

As illustrated in FIG. 5, the affinity scoring engine 500 includes an affinity scoring manager 505, a word filtering and stemming module 510, a word score module 515, and a score calculator 520. In addition, FIG. 5 illustrates storages 525-545. In some embodiments, the storage 525 stores business content that has been classified by the pre-processing system described above. The storage 530 is for storing relevancy scores that the pre-processing system calculated for the business content stored in the storage 525 when the pre-processing system processed the business content.

The storage 535 of some embodiments stores content classification data that the pre-processing system generated for the business content stored in the storage 525 when the pre-processing system processed the business content. For instance, in some embodiments, the content classification data includes a defined number (e.g., 3, 5, 10, etc.) of industries for each piece of content to which the piece of content was tagged as being closest (e.g., most relevant), a set of entities to which the piece of content is related, a set of topics to which the piece of content is related, and/or any other type of data that describes the classification of the piece of content.

The storage 540 stores stop words, which are described in further detail below, that are used for determining word scores for words in a piece of content being processed by the affinity scoring engine 500. In some embodiments, the storage 545 is for glossaries generated by a glossary generator (e.g., the glossary generator described above by reference to FIGS. 2-4).

The storages 525-545 of some embodiments are implemented as one physical storage while the storages 525-545 of other embodiments are implemented in separate physical storages. Still, in some embodiments, one or more of the storages 525-545 are implemented across multiple physical storages.

The affinity scoring manager 505 is responsible for the determining an affinity of a piece of content to a set of industries. In some embodiments, the affinity scoring manager 505 processes a piece of content after the piece of content has been processed by the pre-processing system described above. In other embodiments, the affinity scoring manager 505 processes content processed by the pre-processing system in batches at defined intervals (e.g., once every hour, twelve hours, day, week, etc.).

In some embodiments, the affinity scoring manager 505 determines affinities of a particular piece of content to each of the defined number of closest industries to which the particular piece of content is tagged. The affinity scoring manager 505 of some embodiments determines an affinity of the particular piece of content to an industry by (1) retrieving the relevancy score for the particular piece of content from the storage 530 and the defined number of closest industries to which the particular piece of content is tagged from the storage 535 and (2) using the modules 510-520 to facilitate the affinity scoring manager 505 in generating an affinity score that represents the affinity of the particular piece of content to the industry.

The word filtering and stemming module 510 handles the filtering of words in a particular piece of content and the stemming of words in the particular piece of content. In some embodiments, the word filtering and stemming module 510 filters the particular piece of content by removing from the particular piece of content any single or double letter words and any words that are identified as entities. Examples of single or double words include "a", "an", "is", "to", "if", etc. The word filtering and stemming module 510 of some embodiments stems words in the particular piece of content in the same or similar manner as the word stemming module 310 described above by reference to FIG. 3.

The word score module 515 determines a word score to assign to a particular piece of content. In some embodiments, the word score module 515 determines the word score for the particular piece of content based on the stop words in the storage 540 and the glossary stored in the storage 546 for the industry to which the affinity scoring manager 505 is determining an affinity of the particular piece of content.

The score calculator 520 calculates an affinity score for a particular piece of content based on the word scores (determined by the word score module 515) associated with the words in the particular piece of content. In some embodiments, the score calculator 520 using equations (3)-(15) in the manner described below.

Figure 6:
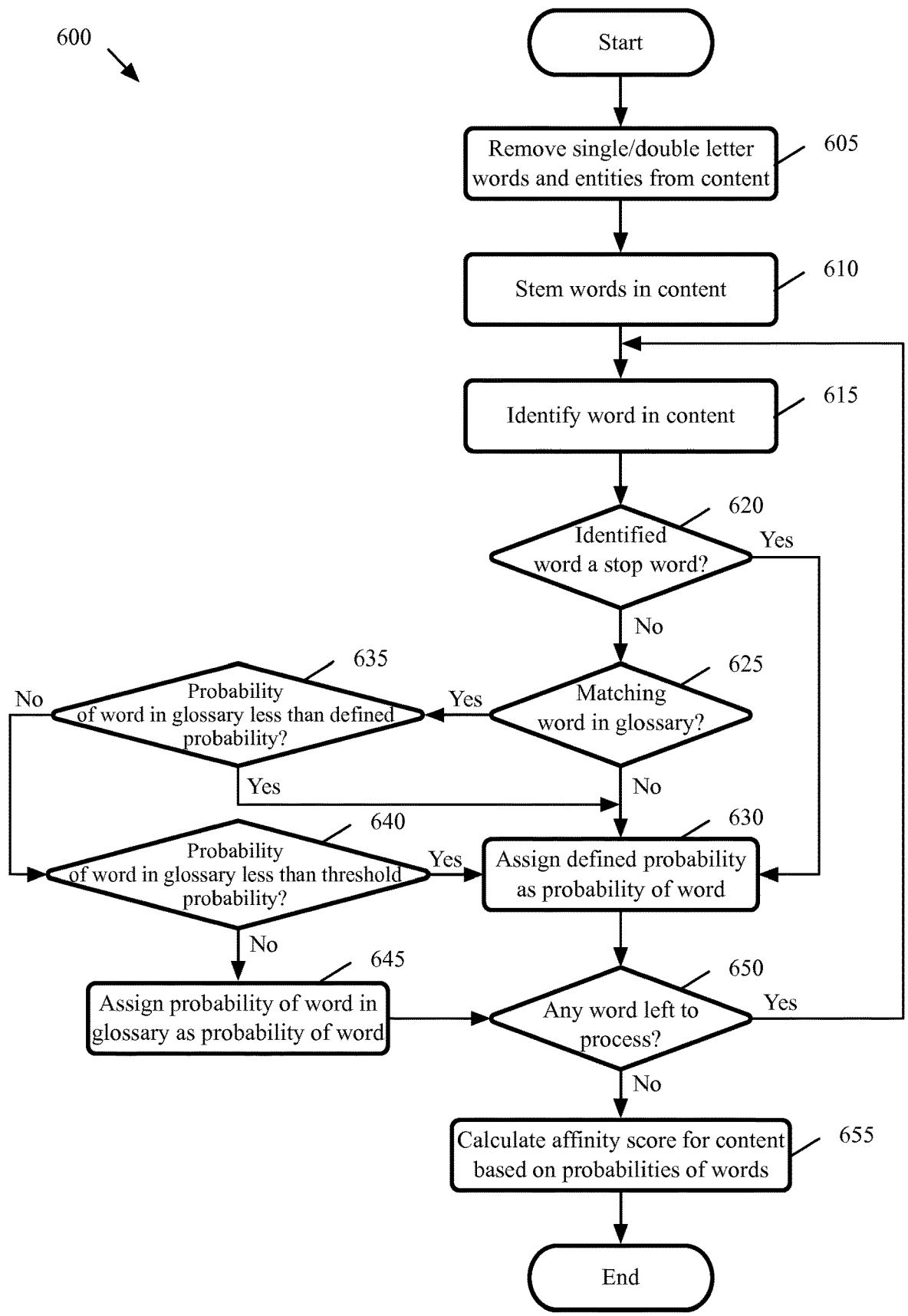
FIG. 6 conceptually illustrates a process of some embodiments for determining the affinity of a piece of content to a particular industry.
Figures 7, 8:
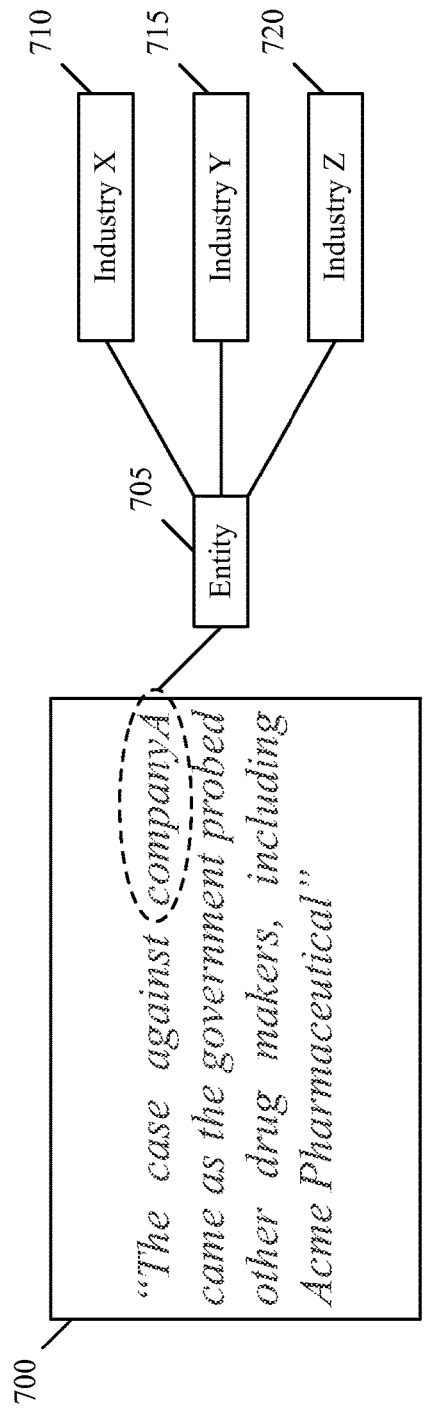
FIG. 7 conceptually illustrates an example piece of content.
FIG. 8 conceptually illustrates an example set of data used for determining an affinity score for the piece of content illustrated in FIG. 7.

An example operation illustrating the affinity scoring engine 500 determining an affinity of a piece of content to a particular industry will now be described by reference to FIGS. 6-8, FIG. 6 conceptually illustrates a process 600 of some embodiments for determining the affinity of a piece of content to a particular industry. In some embodiments, the affinity scoring engine described above by reference to FIG. 1 performs the process 600 for each industry to which the piece of content is specified as being closest (e.g., industries 1-3 for content 105 in FIG. 1). FIG. 7 conceptually illustrates an example piece of content 700 while FIG. 8 conceptually illustrates an example set of data 800 used for determining an affinity score for the piece of content 700 illustrated in FIG. 7.

The operation starts by the affinity scoring manager 505 instructing the word filtering and stemming module 510 to filter and stem the words in a piece of content stored in storage 525. In response, the word filtering and stemming module 510 starts the process 600 by performing 605 to remove any single or double letter words from the piece of content as well as any words that are identified as entities and performing 610 to stem the words in the piece of content. In some embodiments, the process 600 stems the words in a similar fashion as that described above by reference to FIGS. 3 and 4. That is, the process 600 stems the words in the piece of content by reducing inflected or derived words to their base or root form.

Referring to FIG. 7 as an example, the piece of content 700 includes a double letter word "as". Additionally, the word "companyA" is identified as an entity, as indicated by an entity tag 705. In some embodiments, the pre-processing system described above generated the tag 705 when the pre-processing system processed the piece of content 700. For this example, the word filtering and stemming module 510 removes the word "as" and "companyA" from the piece of content 700.

Next, when the affinity scoring manager 505 receives from the word filtering and stemming module 510 the piece of content with the words filtered and stemmed, the affinity scoring manager 505 performs 615 of the process 600 to identify a word in the piece of content. Then, the affinity scoring manager 505 instructs the word score module 515 to determine a word score for the identified word.

The word score module 515 determines the word score for the identified word by performing 620 of process 600 to determine whether the identified word is a stop word. In some embodiments, a stop word is a word that is determined to be common across at least a defined number of industries and has a low score associated with the word in each glossary of those industries across which the word is common (i.e., a low probability of an industry given the word for all of those industries). Examples of stop words include numbers, dates, high incidence words (e.g. "also", etc.), times, names of places, etc. Some embodiments consider every word in every piece of content that is specified as being related to an industry as possible stop words.

In some embodiments, a particular word is determined to be a stop word when (1) the particular word occurs across a defined number of industries (e.g., twenty-five industries, fifty industries, a hundred industries, etc.) and (2) the conditional probability of the industry being tagged to the content given that particular word has occurred is less than or equal a defined threshold probability (e.g., a defined neutral probability described below, a multiple, such as 1.2, of the defined neutral probability described below, etc.) for each of these industries. In some embodiments, the stop word is allowed to have a defined number (e.g., one industry, two industries, five industries, etc.) of those industries in each of which the glossary word score for those industries is greater than the defined threshold probability by a defined amount (e.g., 0.01, 0.05, 0.1, etc.) or a defined percentage (e.g., 0.05%, 1%, 1.5%, etc.). In an example where the defined number of industries for a stop word is fifty, if (1) a particular word has a glossary word score in an industry that is less than or equal to the defined threshold probability for each of forty-eight industries and (2) the particular word has a glossary word score in an industry that is greater than the defined threshold probability by less than the defined amount, the particular word is determined to be a stop word.

When the process 600 determines that the identified word is a stop word (e.g., the identified word matches a word stored in the storage 540), the word score module 615 performs 630 of process 600 to assign the value of a defined neutral probability as the value of the probability associated with the identified word (also referred to as the word score for the identified word). In other words, the word score for the identified word represents the conditional probability that the piece of content is related to the particular industry (e.g., the particular industry is tagged to the piece of content) given the identified word occurs in the piece of content. In some embodiments, instead of assigning a word score for the identified word, the process 600 discards the identified word and does not assign a value for the identified word nor consider the word in the affinity score calculation when the process 600 determines that the identified word is a stop word.

Different embodiments use different defined neutral probabilities. For example, some embodiments use the probability of the particular industry expressed in equation (2) above because this probability is considered neutral since a particular word does not have any effect on the affinity of the piece of content to the particular industry when the score for the particular word in the glossary is the same as the probability that a random piece of content is related to an industry (e.g., the random piece of content being tagged to the industry). After assigning the value of the defined neutral probability as the value of the probability associated with the identified word, the word score module 515 sends the identified word and its assigned value to the affinity scoring manager 505 and the process 600 proceeds to 650.

If the process 600 determines that the identified word is not a stop word, the word score module 515 performs 625 of the process 600 to determine whether a word in the glossary matches the identified word. If the process 600 determines that a word in the glossary does not match the identified word, the process 600 proceeds to 630 and assigns the value of the defined neutral probability as the value of the probability associated with the identified word.

When the process 600 determines that a word in the glossary matches the identified word, the word score module 515 performs 635 of the process 600 to determine whether the value of the probability of the matching word in the glossary is less than the value of the defined neutral probability. As noted above, when the score for a particular word in the glossary is the same as the probability of the particular industry, the particular word does not have any effect on the affinity of the piece of content to the particular industry. In addition, when the score for a particular word in the glossary is the greater than the probability of the particular industry, the particular word increases the affinity of the piece of content to the particular industry while when the score for a particular word in the glossary is the less than the probability of the particular industry, the particular word decreases the affinity of the piece of content to the particular industry.

Thus, if the piece of content is specified as being closest to industries that usually do not operate together, the affinity score of the piece of content would score low for each of these disparate industries because the words associated with one industry will pull down the score of the other industry and vice versa. For example, a piece of content that relates to the car industry incorporating a blood pressure monitor into automobiles would score low for each of the industries because the words associated with the auto industry will pull down the score of the medical industry and the words associated with the medical industry will pull down the score of the auto industry. By assigning the defined neutral probability to words that match words in the glossary with probabilities less than the defined neutral probability, the affinity score of the piece of content is prevented from being pulled down by the words associated with other industries.

When the process 600 determines that the value of the probability of the matching word in the glossary is less than the defined neutral probability, the word score module 515 performs 630 of the process 600 to assign the value of the defined neutral probability as the value of the probability associated with the identified word. Otherwise, the word score module 515 performs 640 of the process 600.

At 640, the score module 515 determines whether the value of the probability of the matching word in the glossary is less than a threshold probability (e.g., 0.01, 0.02, 0.05, 0.1, etc.). When the process 600 determines that the value of the probability of the matching word in the glossary is less than the threshold probability, the score module 515 performs 630 of the process 600 to assign the value of the defined neutral probability as the value of the probability associated with the identified word. When the process 600 determines that the value of the probability of the matching word in the glossary is not less than the threshold probability, the score module 515 performs 645 of the process 600 to assign the value of the probability of the matching word in the glossary as the value of the probability associated with the identified word. Once assigning the value of the probability of the matching word in the glossary as the value of the probability associated with the identified word, the word score module 515 sends the identified word and its assigned value to the affinity scoring manager 505 and the process 600 proceeds to 650.

At 650 of the process 600, the affinity scoring manager 505 determines whether any whether any word in the piece of content is left to process. If the process 600 determines that a word is left to process, the affinity scoring manager performs 615 of the process 600 again to continue processing any remaining words in the piece of content. When the process 600 determines that no word is left in the piece of content to process, the process 600 continues to 655.

Finally, the affinity scoring manager 505 directs the score calculator 520 to perform 655 of the process 655 to calculate the affinity score for the piece of content based on the probabilities assigned to the words in the piece of content. Based on the Naïve Bayes assumption mentioned above, the probability of the piece of content given the particular industry is the product of the probability of each word given the particular industry as expressed in the following equation (3):

$$P(\text{content} \mid \text{Industry}) = \prod_{i=1}^{n} P(word_i \mid \text{Industry}) \quad (3)$$

where n is the number of words in the piece of content. The probability of the particular industry given the piece of content and the probability of not the particular industry given the piece of content in the following equations (4) and (5) are derived using equation (3) and the Joint Probability formula:

$$P(\text{Industry} \mid \text{content}) = \frac{P(\text{content} \mid \text{Industry}) * P(\text{Industry})}{P(\text{content})} \quad (4)$$

$$P(\text{notIndustry} \mid \text{content}) = \quad (5)$$
$$1 - P(\text{Industry} \mid \text{content}) = \frac{P(\text{content} \mid \text{notIndustry}) * P(\text{notIndustry})}{P(\text{content})}$$

P(content), which represents probability that the piece of content will occur at all, is cancelled using the Generalized Likelihood Ratio in the following equation (6):

$$\text{LikelihoodRatio} = \frac{P(\text{Industry} \mid \text{content})}{P(\text{notIndustry} \mid \text{content})} \quad (6)$$

When the ratio is less than one, the piece of content is not mapped to the particular industry whereas when the ratio is greater than or equal to one, the piece of content is mapped to the particular industry. The ratio in equation (6) may be represented using the equations (4) and (5) above as the following equation (7):

$$\frac{\frac{P(\text{content} \mid \text{Industry}) * P(\text{Industry})}{P(\text{content})}}{\frac{P(\text{content} \mid \text{notIndustry}) * P(\text{notIndustry})}{P(\text{content})}} = \quad (7)$$

$$\frac{\prod_{i=1}^{n} P(word_i \mid \text{Industry})}{\prod_{i=1}^{n} P(word_i \mid \text{notIndustry})} * \frac{P(\text{Industry})}{P(\text{notIndustry})}$$

Based on Joint Probability Axioms, the probability of a word given the particular industry and the probability of a word given not the particular industry in equation (7) can be expressed in the following equations (8) and (9):

$$P(word_i \mid \text{Industry}) \frac{P(\text{Industry} \mid word_i) * P(word_i)}{P(\text{Industry})} \quad (8)$$

$$P(word_i \mid \text{notIndustry}) \frac{(1 - P(\text{Industry} \mid word_i)) * P(word_i)}{1 - P(\text{Industry})} \quad (9)$$

Substituting equations (8) and (9) into equation (7) gives the following equation (10):

$$\frac{P(\text{Industry} \mid \text{content})}{P(\text{notIndustry} \mid \text{content})} = \quad (10)$$

$$\frac{P(\text{Industry})}{P(\text{notIndustry})} * \frac{\prod_{i=1}^{n} \frac{P(\text{Industry} \mid word_i) * P(word_i)}{P(\text{Industry})}}{\prod_{i=1}^{n} \frac{(1 - P(\text{Industry} \mid word_i)) * P(word_i)}{1 - P(\text{Industry})}}$$

Equation (10) can be expressed in the following equation (11):

$$\frac{P(\text{Industry} \mid \text{content})}{P(\text{notIndustry} \mid \text{content})} = \quad (11)$$

$$\left(\frac{1 - P(\text{Industry})}{P(\text{Industry})}\right)^{n-1} * \frac{\prod_{i=1}^{n} P(\text{Industry} \mid word_i)}{\prod_{i=1}^{n} (1 - P(\text{Industry} \mid word_i))}$$

Next, an inverse function is used to solve for the probability of the particular industry given the piece of content. In particular, equation (6) can be expressed as the following equation (12):

$$\text{LikelihoodRatio} = \frac{P(\text{Industry} \mid \text{content})}{1 - P(\text{Industry} \mid \text{content})} \quad (12)$$

The following equation (13) expresses equation (12) in simple terms:

$$x = \frac{y}{1-y} \quad (13)$$

where x is LikelihoodRatio and y is the probability of the particular industry given the piece of content, P(Industry|content). The inverse transform of equation (13) is shown in the following equation (14):

$$y = \frac{x}{1+x} \quad (14)$$

Substituting the variables in equation (12) in equation (14) gives the following equation (15)

$$P(\text{Industry} \mid \text{content}) = \frac{LikelihoodRatio}{1 + LikelihoodRatio} \quad (15)$$

The probability of the industry given the content, P(Industry|content), in equation (15) can be solved using equations (6)-(11). The process 600 uses the value of P(Industry|content) as the affinity score of the piece of content to the particular industry.

Referring to FIG. 8 as an example, the example set of data 800 represents data that the score calculator 520 uses to calculate an affinity score that represents the affinity of the piece of content 700 illustrated in FIG. 7 to industry X. As explained above, the piece of content 700 includes a word "companyA" that is identified as an entity. In addition, FIG. 7 illustrates a set of industry tags 710-720 that represents the three closest industries (industries X-Z in this example) to which the piece of content 700 is tagged as being closest. In some embodiments, piece of content 700 was tagged with the industry tags 710-720 based on the entity indicated by tag 705 and distances (e.g., the shortest distances) between the entity and industries in the business web graph when the piece of content 700 was processed by the pre-processing system described above.

As shown in FIG. 8, the set of data 800 includes an industry X affinity score, a set of affinity tokens, a set of matching words, and a default score. The set of affinity tokens are the words in the piece of content 700 that are used for calculating an affinity score that represents the affinity of the piece of content 700 to industry X. In some embodiments, the set of affinity tokens are the words in the piece of content 700 after the word filtering and stemming module 510 filters and stems the words in the piece of content 700. The set of matching words are words in the glossary generated for industry X that match words in the set of affinity tokens and the matching words' corresponding glossary word scores. The words score module 515 uses these glossary word scores to assign words scores for the matching words in the set of affinity tokens. The default score in this example is the default neutral probability (e.g., the probability of the industry X expressed in equation (2) discussed above) explained above that the words score module 515 uses to assign words scores to words in the piece of content 700 that do not match any words in the glossary for industry X, words in the piece of content 700 that match words in the glossary for industry X with a glossary word score that do not pass a threshold value, and words in the piece of content 700 that match words in the glossary for industry X with a glossary word score that are less than the default neutral probability. The industry X affinity score (99.9270 in this example) is the affinity score that the score calculator 520 calculated based on the words in the set of affinity tokens and the set of corresponding word scores and the equations (3)-(15) described above.

Once the affinity scoring engine 500 determines (e.g., by performing the process 600 described above by reference to FIG. 6) the affinity score for each of the industries to which the piece of content is specified as being closest, the affinity scoring manager 505 of the affinity scoring engine 500 in some embodiments combines the affinity scores into a single affinity score. In some embodiments, the affinity scoring manager 505 combines affinity scores by calculating a weighted sum of the affinity scores according to the degree of relevancy to the corresponding industry. The weighted sum is expressed in the following equation (16):

$$combinedIndustryAffinityScore = \frac{\sum_{i=1}^{k} affinity_i * 2^{1-rank}}{\sum_{i=1}^{k} 2^{1-rank}} \quad (16)$$

where k is the number of affinity scores, affinity, is the affinity score for industry i, and rank is the ranking of the affinity score with respect to the other affinity scores, with a ranking of 1 being the highest affinity score and a ranking of k being the lowest affinity score.

As described above, the affinity scoring engine of some embodiments uses the determined affinity scores to modify the relevancy (e.g., the relevancy score) of pre-processed content. In some embodiments, the affinity scoring manager 505 of the affinity scoring engine 500 also determines (1) a combined affinity score that represents the affinity of a piece of content to one or more business topics (e.g., earnings and/or dividends, corporate governance, marketing initiatives, analyst ratings, etc.) and (2) an affinity score that represents the affinity of the piece of content to business generally. The glossary for determining the affinity of the piece of content to business includes the collection (or a subset) of stop words described above.

In some embodiments, the affinity scoring manager 505 modifies the relevancy score of the piece of content based on the different affinity scores mentioned above. Each of the affinity scores and the relevancy score is associated with a confidence value and a normalization factor in some embodiments. A modified version of each score is calculated using the following equation (17):

$$modifiedScore = score * scoreNormalization * scoreConfidence \quad (17)$$

where score is the original score, the scoreNormalization is the normalization factor associated with score, and the scoreConfidence is the confidence value associated with score. The affinity scoring manager 505 of some embodiments combines the modified scores to produce a modified relevancy score by using the following equation (18):

$$modifiedComboScore = \frac{\sum_{i=1}^{j} modifiedScore_i}{\sum_{i=1}^{j} scoreConfidence_i} \quad (18)$$

III. Example System

Figure 9:
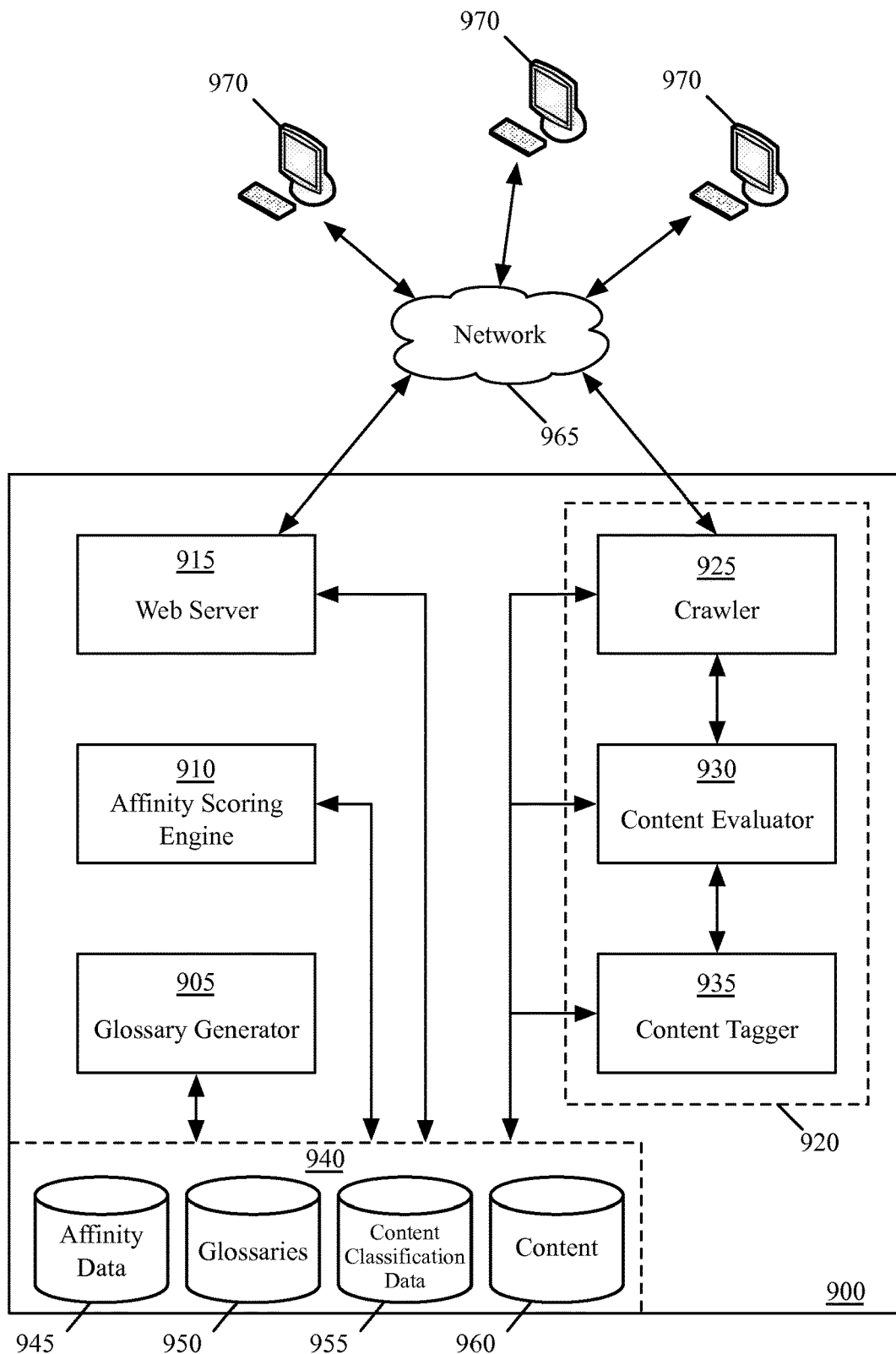
FIG. 9 conceptually illustrates a software architecture of a system of some embodiments.

In some embodiments, the glossary generator and the affinity scoring engine are used within a system (e.g., the pre-processing system described above) that classifies content that the system discovers. FIG. 9 conceptually illustrates a software architecture of such a system 900 of some embodiments. One of ordinary skill will recognize that the various modules shown in this figure may all operate on a single electronic device (e.g., a server) or may be implemented across multiple devices.

As shown, the system 900 includes a glossary generator 905, an affinity scoring engine 910, a web server 915, and a content retrieval and classification system 920, and storages 940. The storages 940 include an affinity data storage 3420 for storing data used for affinity scoring (e.g., stop words), a glossaries storage 950 for storing generated glossaries, a content classification data storage 955 for storing data related to the classification of content, and a content storage 960 for storing the content. In some embodiments, the storages 940 are implemented as one physical storage while, in other embodiments, the storages 940 are implemented in separate physical storages. Still, in some embodiments, one or more of the storages 945-960 are implemented across multiple physical storages.

In some embodiments, the glossary generator 905 is implemented by a glossary generator described above by reference to FIGS. 2-4. The affinity scoring engine 910 of some embodiments is implemented by an affinity scoring engine described above by reference to FIGS. 1 and 5-8. The web server 915 is a set of computing devices that provides requested information (e.g., web pages) to clients 970 through a network 965. For instance, a client 970 may send to the web server 915 a request for a web page that includes, or a search query for, content related to a particular category. In response, the web server 915 provides the requested content (e.g., stored in the storage 960) to the client 970 based on the processing of the content performed by the content retrieval and classification system 920 and the affinity scoring engine 910. In some embodiments, the network 965 may be a local area network, a wide area network, a network of networks (e.g., the Internet), a wireless network, a mobile network, or any other type of communication network.

As shown, the content retrieval and classification system 920 includes a content crawler 925, a content evaluator 930, and a content tagger 935. The content crawler 925 is connected to the network 965 and crawls the network (e.g., the Internet) on a real-time or periodic basis to identify new content. The content crawler 925 may be any commercially used crawler, such as any known web crawler. The web crawler 925 of some embodiments downloads copies of the new content and stores the copies of the content in the content storage 960.

In some embodiments, the content evaluator 930 evaluates each piece of the new content using models for a wide variety of categories to determine which pieces content are relevant to which categories. The content tagger 935 of some embodiments tags the content in the content storage 960 with category tags and calculates scores for the categories to which the documents are relevant. In some embodiments, the content tagger 935 stores the category tags and scores in the storage 955.

While many of the features of system 900 have been described as being performed by one module (e.g., the affinity scoring engine 910), one of ordinary skill will recognize that the functions might be split up into multiple modules (e.g., a module for calculating affinity scores and a module for modifying content relevancy scores based on affinity scores). Furthermore, the modules shown might be combined into a single module in some embodiments (e.g., the glossary generator 905 could be part of the affinity scoring engine 910).

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
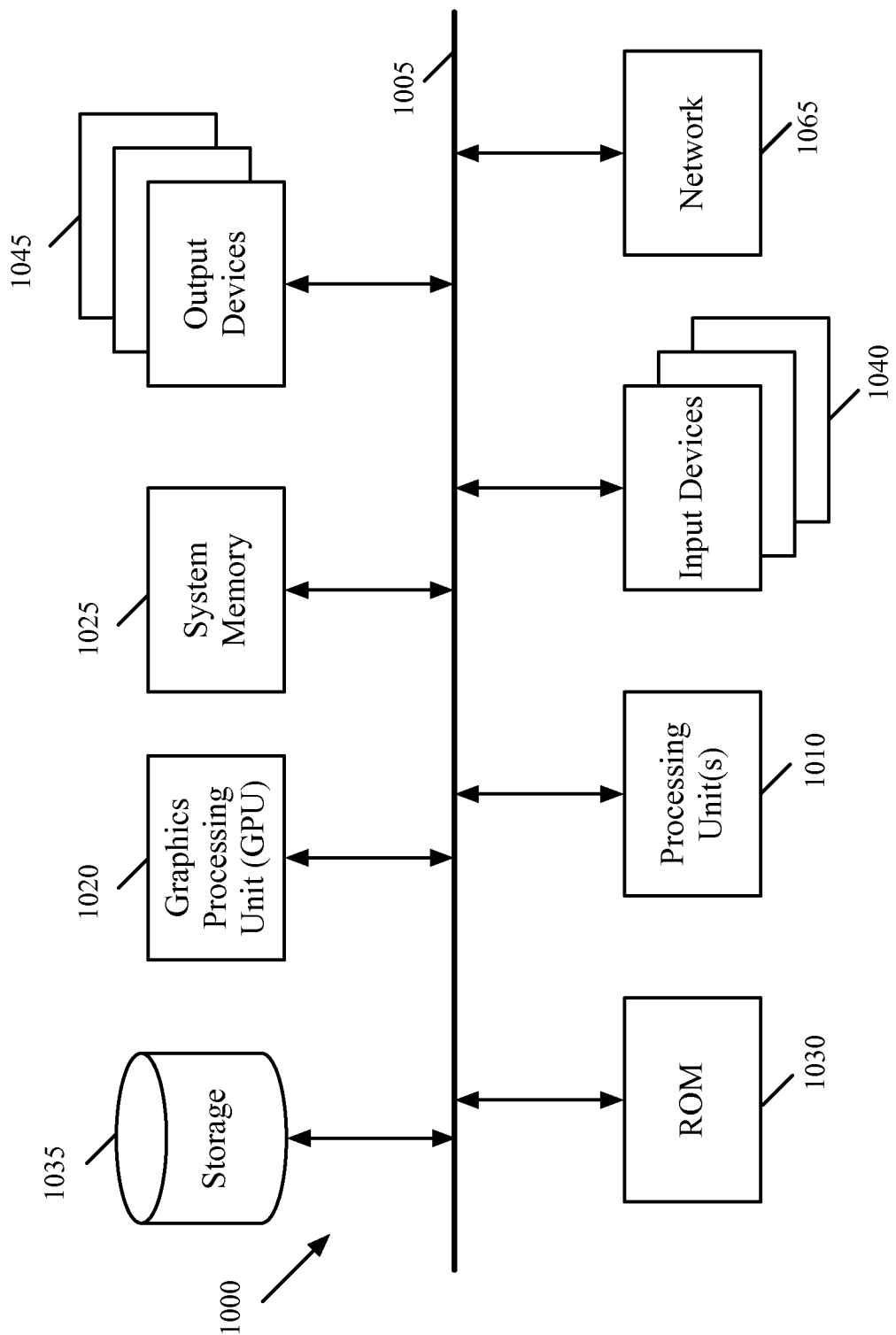
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1000 includes a bus 1005, processing unit(s) 1010, a graphics processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the GPU 1015, the system memory 1020, and the permanent storage device 1035.

From these various memory units, the processing unit(s) 1010 retrieves instructions to execute and data to process in order to execute the processes of the invention. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash memory device, etc., and its corresponding disk drive) as the permanent storage device. Like the permanent storage device 1035, the system memory 1020 is a read-and-write memory device. However, unlike storage device 1035, the system memory 1020 is a volatile read-and-write memory, such as random access memory. The system memory 1020 stores some of the instructions and data that the processor needs at runtime. In some embodiments, the invention's processes are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A system comprising:

one or more processors; and a memory storing code stored therein for determining a relatedness of content items to categories, wherein when executed the code causes the one or more processors to perform operations comprising:

pre-processing content to obtain information in the content, classify the content as pertaining to one or more categories based on the information, and organizing the content in terms of relevancy to categories;

identifying a particular content item of the pre-processed content, a relevancy score associated with the particular content item, and a set of categories to which the particular content item is classified as related;

generating glossaries associated with the set of categories, wherein generating each glossary of the glossaries comprises:
using a glossary manager:
directing a word stemming module to stem words in a collection of content to reduce words to a base form;
receiving the collection of content with the words stemmed;
identifying business content that is tagged to a particular category using a word frequency module and a glossary word score module to calculate glossary word scores for words that occur in the content tagged to the particular category; and
applying a frequency threshold when generating the glossary and excluding a particular word in the glossary when the particular word does not occur in at least a predetermined number of pieces of content that is tagged to the particular category:
based on probability values in the set of glossaries associated with the set of categories, calculating a set of affinity scores that each represent a degree of relevancy between the particular content item and a category in the set of categories, wherein each glossary associated with a particular category in the set of categories comprises a set of words and a corresponding set of glossary word scores that represent the probability values that a given content items are related to the particular category when the content items contain the word associated with the glossary word score; and
modifying the relevancy score associated with the particular content item based on the calculated set of affinity scores.

2. The system of claim 1, wherein modifying the relevancy score associated with the particular content item comprises calculating a weighted sum of the set of affinity scores based on degrees to which the set of categories is classified as related to the particular content item.

3. The system of claim 1, wherein modifying the relevancy score associated with the particular content item comprises normalizing the relevancy score associated with the particular content item and the set of affinity scores.

4. The system of claim 1, wherein the set of categories is a set of industries.

5. The system of claim 1, wherein the particular content item comprises a word that is identified as an entity.

6. The system of claim 1, wherein the set of categories to which the particular content item is classified as related is based on a business web graph comprising a node that represents the entity and a set of nodes that represents the set of categories.

7. The system of claim 1, wherein the code is further executable by the one or more processors to cause the processor to perform:
identifying a set of glossaries, each glossary associated with a category in the set of categories and comprising a set of (i) words and (ii) corresponding glossary word scores that each represents the probability that a given content item is related to the category when the content item contains the word associated with the glossary word score.

8. A system comprising:
one or more processors; and
a memory storing code stored therein for determining a relatedness of content items to categories, wherein when executed the code causes the one or more processors to perform operations comprising:
pre-processing content to obtain information in the content, classify the content as pertaining to one or more categories based on the information, and organizing the content in terms of relevancy to categories, wherein the pre-processing of the content comprises:
generating glossaries associated with the set of categories, wherein generating each glossary of the glossaries comprises:
using a glossary manager:
directing a word stemming module to stem words in a collection of content to reduce words to a base form;
receiving the collection of content with the words stemmed;
identifying business content that is tagged to a particular category using a word frequency module and a glossary word score module to calculate glossary word scores for words that occur in the content tagged to the particular category;
applying a frequency threshold when generating the glossary and excluding a particular word in the glossary when the particular word does not occur in at least a predetermined number of pieces of content that is tagged to the particular category;
providing an affinity scoring manager for identifying a particular content item of the pre-processed content including at least one of the glossaries, a relevancy score associated with the particular content item, and a set of categories to which the particular content item is classified as related;
providing a word score module for calculating a set of affinity scores that each represents a degree of relevancy between the particular content item and a category in the set of categories, wherein (i) the calculating is based on probability values in a set of glossaries associated with the set of categories and (ii) each glossary associated with a particular category in the set of categories comprises a set of words and a corresponding set of glossary word scores that represent the probability values that a given content items are related to the particular category when the content items contain the word associated with the glossary word score; and
providing a score calculator for calculating a weighted sum of the set of affinity scores based on degrees to which the set of categories is classified as related to the particular content item, wherein the affinity scoring manager is further for modifying the relevancy score associated with the particular content item based on the calculated set of affinity scores.

9. The system of claim 8, wherein modifying the relevancy score associated with the particular content item comprises calculating a weighted sum of the set of affinity scores based on degrees to which the set of categories is classified as related to the particular content item.

10. The system of claim 8, wherein modifying the relevancy score associated with the particular content item comprises normalizing the relevancy score associated with the particular content item and the set of affinity scores.

11. The system of claim 8, wherein the set of categories is a set of industries.

12. The system of claim 8, wherein the particular content item comprises a word that is identified as an entity.

13. The system of claim 8, wherein the set of categories to which the particular content item is classified as related is based on a business web graph comprising a node that represents the entity and a set of nodes that represents the set of categories.

14. The system of claim 8, wherein the code is further executable by the processor to cause the processor to perform:
identifying a set of glossaries, each glossary associated with a category in the set of categories and comprising a set of (i) words and (ii) corresponding glossary word scores that each represents the probability that a given content item is related to the category when the content item contains the word associated with the glossary word score.

15. The system of claim 8, wherein the affinity scoring manager modifies the relevancy score by normalizing the relevancy score associated with the particular content item and the set of affinity scores.

16. The system of claim 8, wherein the set of categories is a set of industries.

17. The system of claim 8, wherein modifying the relevancy score associated with the particular content item comprises calculating a weighted sum of the set of affinity scores based on degrees to which the set of categories is classified as related to the particular content item.

18. The system of claim 8, wherein modifying the relevancy score associated with the particular content item comprises normalizing the relevancy score associated with the particular content item and the set of affinity scores.

* * * * *